(12) United States Patent
Embleton et al.

(10) Patent No.: US 10,573,329 B2
(45) Date of Patent: Feb. 25, 2020

(54) HIGH FREQUENCY INJECTION FOR IMPROVED FALSE ACCEPTANCE REDUCTION

(71) Applicant: Dell Products L.P., Round Rock, TX (US)

(72) Inventors: Steven Thomas Embleton, Austin, TX (US); Eric Michael Tunks, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/610,350

(22) Filed: May 31, 2017

(65) Prior Publication Data

US 2018/0350376 A1    Dec. 6, 2018

(51) Int. Cl.
*G10L 19/018* (2013.01)
*G10L 15/22* (2006.01)

(52) U.S. Cl.
CPC ............ *G10L 19/018* (2013.01); *G10L 15/22* (2013.01); *G10L 2015/223* (2013.01)

(58) Field of Classification Search
CPC ....... G10L 19/018; G10L 15/01; G10L 15/20; G10L 25/18; G10L 25/51; G06F 17/30743
See application file for complete search history.

(56) References Cited

U.S. PATENT DOCUMENTS

| | | | | |
|---|---|---|---|---|
| 6,157,330 A | * | 12/2000 | Bruekers | G06T 1/0035 341/143 |
| 7,272,718 B1 | * | 9/2007 | Matsumura | G10L 19/018 380/217 |
| 9,368,105 B1 | * | 6/2016 | Freed | G10L 15/22 |
| 9,548,053 B1 | * | 1/2017 | Basye | G10L 15/22 |
| 9,691,378 B1 | * | 6/2017 | Meyers | G10L 15/08 |
| 9,704,478 B1 | * | 7/2017 | Vitaladevuni | G10L 15/00 |

(Continued)

FOREIGN PATENT DOCUMENTS

EP    1973103 A1  *  9/2008  ........... G10L 19/018

OTHER PUBLICATIONS

"I may have found how Amazon prevents the echo from activing during commercials." retrieved Apr. 15, 2018, available to the public at "https://www.reddit.com/r/amazonecho/comments/5oer2u/i_may_have_found_how_amazon_prevents_the_echo/" on Jan. 17, 2017.*

*Primary Examiner* — Andrew C Flanders
(74) *Attorney, Agent, or Firm* — Norton Rose Fulbright US LLP

(57) ABSTRACT

Methods and systems for high frequency injection and detection for improved false acceptance reduction are disclosed. An information handling system may be configured to receive audio data and to add an identification signal to the audio data, wherein the identification signal is determined based on the audio data. The combined audio data and the identification signal may be output to a receiving device. An information handling system may also be configured to receive data that includes audio data and an identification signal that is associated with one or more frequencies in the audio data, identify the one or more frequencies in the audio data that are associated with the identification signal, and attenuate the one or more frequencies in the audio data to obtain modified audio data. The modified audio data may be output for audio processing.

20 Claims, 8 Drawing Sheets

(56) References Cited

U.S. PATENT DOCUMENTS

| | | | |
|---|---|---|---|
| 9,728,188 B1* | 8/2017 | Rosen | G10L 15/22 |
| 9,734,845 B1* | 8/2017 | Liu | G10L 25/78 |
| 2003/0079131 A1* | 4/2003 | Reefman | G11B 20/00086 |
| | | | 713/176 |
| 2004/0030900 A1* | 2/2004 | Clark | G10L 19/018 |
| | | | 713/176 |
| 2004/0068399 A1* | 4/2004 | Ding | G10L 19/018 |
| | | | 704/200.1 |
| 2006/0265217 A1* | 11/2006 | Bicego | G10L 15/22 |
| | | | 704/231 |
| 2011/0029370 A1* | 2/2011 | Roeding | G06Q 30/00 |
| | | | 705/14.38 |
| 2011/0208520 A1* | 8/2011 | Lee | G10L 25/78 |
| | | | 704/233 |
| 2012/0216226 A1* | 8/2012 | Humphrey | G06Q 30/02 |
| | | | 725/34 |
| 2014/0050321 A1* | 2/2014 | Albert | H04W 12/04 |
| | | | 380/270 |
| 2014/0222438 A1* | 8/2014 | Courtney, III | H04L 67/2823 |
| | | | 704/500 |
| 2015/0039303 A1* | 2/2015 | Lesso | G10L 15/28 |
| | | | 704/233 |
| 2015/0215668 A1* | 7/2015 | Chawla | H04N 21/4394 |
| | | | 725/18 |
| 2017/0133041 A1* | 5/2017 | Mortensen | G10L 25/78 |

* cited by examiner

HIGH FREQUENCY INJECTION FOR IMPROVED FALSE ACCEPTANCE REDUCTION

FIELD OF THE DISCLOSURE

The instant disclosure relates to signal transmission and reception. More specifically, portions of this disclosure relate to an identification signal injection and detection for improved false acceptance reduction.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to process voice commands. However, microphones of an information handling system may inadvertently pick up and receive audio that contains voices but should not be processed for voice commands. When this happens, incorrect voice commands are processed by the information handling system. For example, a TV may output speech in an advertisement or news program that triggers a response from a nearby information handling system. That response may be undesirable, such as where the voice command causes the ordering of undesired products from a smart home device.

SUMMARY

An information handling system may be configured to transmit and/or receive signals that trigger functionality of other information handling systems. For example, an information handling system may transmit and/or receive audio signals. To prevent some audio signals from falsely triggering functionality of an information handling system (also referred to as "false acceptance"), an information handling system transmitting audio signals may inject a frequency signal into an audio signal to identify that audio signal as an audio signal that may be ignored. An information handling system receiving the audio signal may, based on the injected frequency signal, ignore the audio signal associated with the injected frequency signal. By ignoring the audio signal, the risk of that audio signal falsely triggering a function of the receiving information handling system may be reduced. This may reduce unintended actions taken by, for example, a smart home device processing voice commands.

According to one embodiment, an apparatus may include a memory and at least one processor coupled to the memory. The at least one processor may be configured to receive audio data. The at least one processor may also be configured to add an identification signal to the audio data, wherein the identification signal is determined based on the audio data, and to output the combined audio data and the identification signal to a receiving device. Example information handling systems that may add the identification signal include a television, a radio, a computer system, a stereo receiver, a projector, a Bluetooth speaker, and other entertainment devices.

According to another embodiment, a method may include receiving audio data. The method may also include adding an identification signal to the audio data, wherein the identification signal is determined based on the audio data, and outputting the combined audio data and the identification signal to a receiving device.

According to certain embodiments, an information handling system may include a memory and at least one processor coupled to the memory. The at least one processor may be configured to receive data that includes audio data and an identification signal that is associated with one or more frequencies in the audio data, and to identify the one or more frequencies in the audio data that are associated with the identification signal. The at least one processor may also be configured to attenuate the one or more frequencies in the audio data to obtain modified audio data and to output the modified audio data for audio processing. Example information handling systems that may receive and decode data may include a laptop computer, a tablet computer, a mobile device, a gaming console, a smart home device, and other computing devices.

In yet another embodiment, a method may include receiving data that includes audio data and an identification signal that is associated with one or more frequencies in the audio data, and identifying the one or more frequencies in the audio data that are associated with the identification signal. The method may further include attenuating the one or more frequencies in the audio data to obtain modified audio data and outputting the modified audio data for audio processing.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
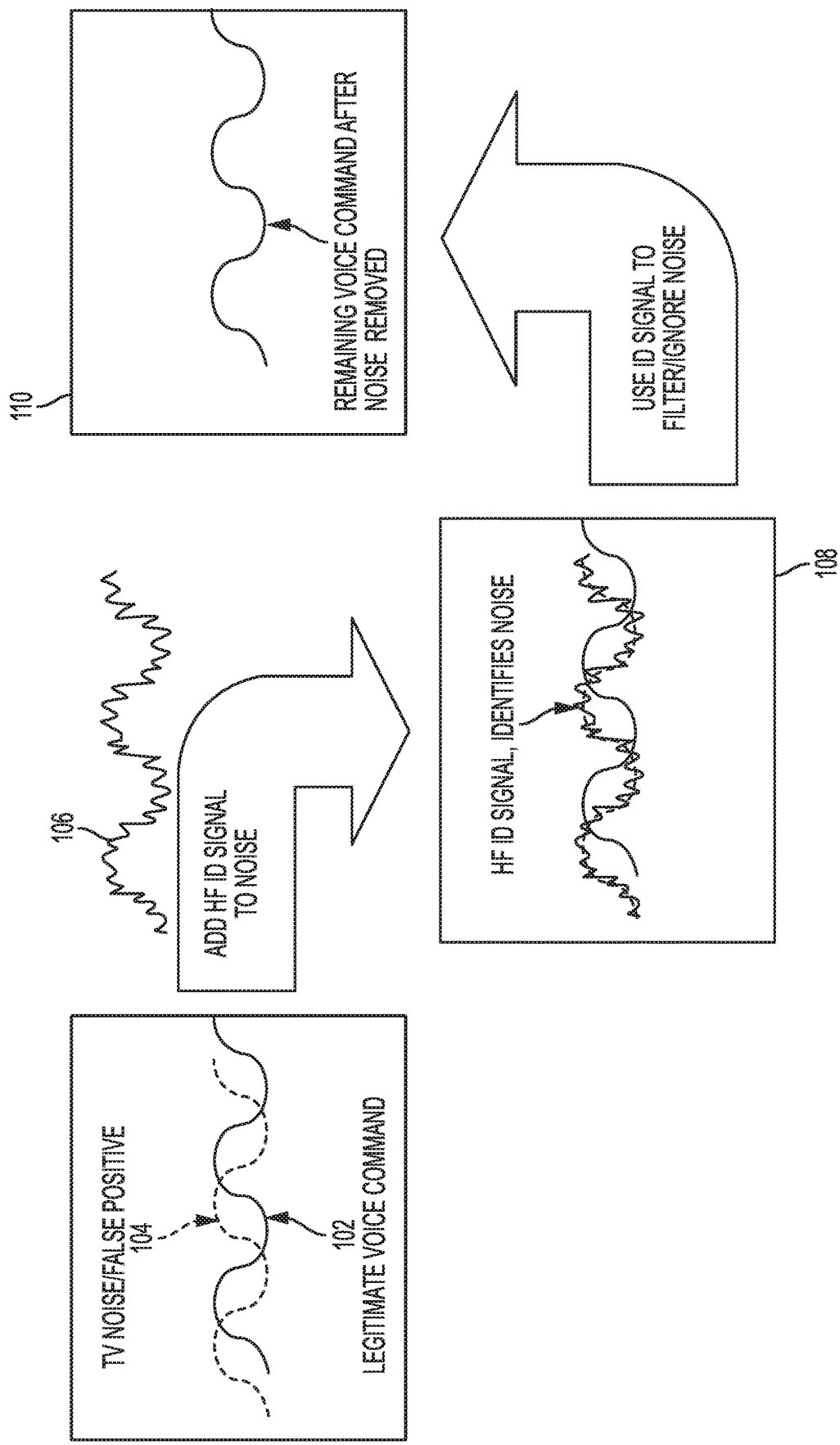
FIG. 1 is a block diagram illustrating the injection and detection of a frequency signal for improved SNR according to some embodiments of the disclosure.

FIG. 1 is a block diagram illustrating the injection and detection of a frequency signal for improved SNR according to some embodiments of the disclosure. For example, FIG. 1 illustrates the reception and processing of signals by an information handling system that includes functionality that may be triggered by a voice command. Additionally, FIG. 1 illustrates the injection of a frequency signal into an audio signal to identify the audio signal as an audio signal that should be ignored by the information handling system receiving the audio signals, thus preventing the audio signal with the injected frequency signal from falsely triggering voice-activated functionality of the information handling system.

Specifically, in FIG. 1, two audio signals may be capable of reception by an information handling system: audio signal 102 that represents a legitimate voice command audio signal that should trigger a voice-activated function of an information handling system receiving audio signal 102; and audio signal 104 that represents a noise or false positive signal that should not trigger the voice-activated function of an information handling system receiving audio signal 104. For simplicity, the audio signals 102 and 104 are illustrated in FIG. 1 as single-frequency signals, i.e., frequency tones. However, one of skill in the art would readily recognize that, in some embodiments, audio signals 102 and 104 may be audio signals that include multiple frequencies.

In certain embodiments, false positive audio signal 104 may be a voice audio signal output by speakers of a television (TV), radio, or other electronic device. As illustrated in FIG. 1, false positive audio signal 104 may include the same audio frequency data as legitimate voice command audio signal 102. This can happen when, for example, a person in a TV/radio show or advertisement speaks a voice command that triggers detection. For example, if the word associated with the legitimate voice command is a common word, such as "hello," it may be very likely that the word "hello" will be said by a voice in a TV/radio show or advertisement. When the audio is output by the speakers of the TV or radio, the audio output triggers a voice-activated function of the information handling system by detecting the word "hello," even though the user of the information handling system did not intend for a voice-activated function to be activated.

To prevent the non-user audio signal from falsely triggering the voice-activated function that should only be triggered by a user audio signal, the information handling system transmitting the non-user audio signal may add an identifier. The identified informs the receiving information handling system that the audio signal was output by a device as opposed to a voice of a user. The receiving system can detect the identifier to know to not trigger a voice-activation function of the information handling system. For example, as illustrated in FIG. 1, the information handling system transmitting audio signal 104 may inject an identification signal 106 (e.g., a high frequency signal) into the false positive audio signal 104 before the false positive audio signal 104 is output by speakers.

The signals received by an information handling system are illustrated at block 108. A first audio signal received is the legitimate voice command audio signal 102. A second audio signal received is a modified audio signal that includes both the content of the false positive audio signal 104 and the identification signal 106. An information handling system may use the high frequency signal injected into false positive audio signal 104 to identify false positive audio signal 104 as an audio signal that should not be allowed to trigger a voice-activation function of the information handling system. By identifying the high frequency signal 106, the receiving information handling system may know to ignore audio signal 104, such as by not performing further processing based on audio signal 104. The result is that essentially only the legitimate voice command audio signal 102 is further processed by the receiving information handling device, as illustrated at block 110. For example, the voice-activated function that should be triggered by legitimate voice command audio signal 102 may be started upon processing of legitimate voice command audio signal 102. Therefore, although the receiving information handling system received both the legitimate voice command audio signal 102 and the false positive audio signal 104, only audio signal 102 resulted in the legitimate triggering of the associated voice-activated function, while audio signal 104 was prevented from falsely triggering the associated voice-activated function.

Figure 2:
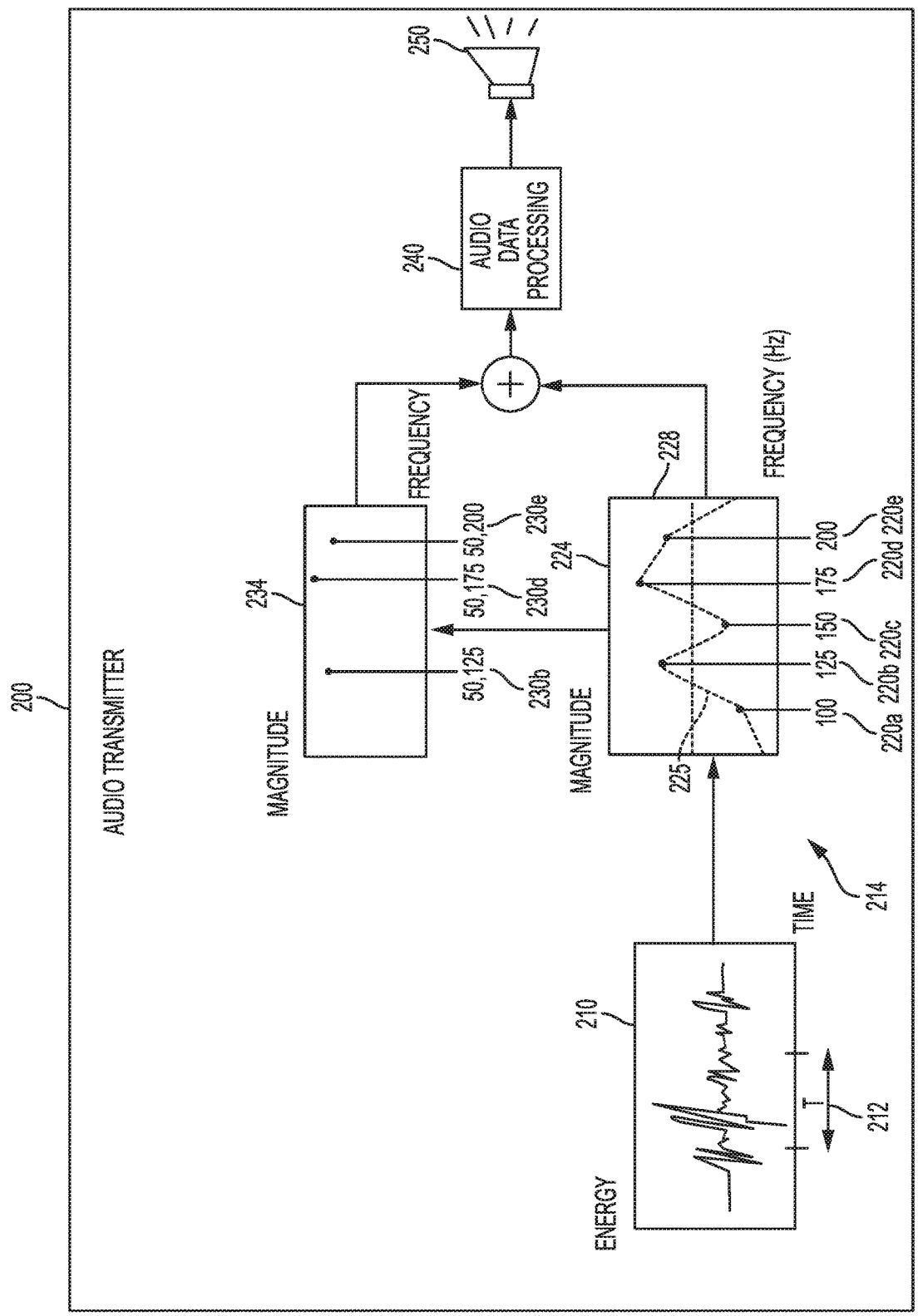
FIG. 2 is a block diagram of an audio transmitter of an information handling system and illustrates the injection of a frequency signal into an audio signal according to some embodiments of the disclosure.

FIG. 2 is a block diagram of an audio transmitter of an information handling system and illustrates the injection of a frequency signal into an audio signal according to some embodiments of the disclosure. An audio transmitter 200 of an information handling system may be configured to receive audio data 210. According to some embodiments, audio data 210 may be audio data that is output by an information handling system and that may trigger a voice-activated function of an information handling system receiving audio data 210. Therefore, audio data 210 may be a false positive audio signal capable of triggering a voice-activated function of an information handling system even though the user of the information handling system did not intend for the voice-activated function to be activated. To prevent audio data 210 from falsely triggering a voice-activated function, audio transmitter 200 may inject a high frequency signal into audio data 214 before the false positive audio data 214 is output by speakers.

In some embodiments, before further processing the audio data 210 for frequency signal injection, the audio data 210 may be partitioned such that further processing of audio data 210 for frequency signal injection is performed by processing partitions of audio data 210 in successive order. A partition may be specified in various manners, such as by time. For example, a time period may be used to separate the audio data 210 into audio data partitions. In the example embodiment illustrated in FIG. 2, time period T is used as the time period for partitioning audio data 210. Time period T may be a predefined and/or adjustable time period. For example, time period T may be a dynamic time period that is adjusted to meet various constraints, such as memory, power, or complexity constraints. In other words, time period T may be a function of various constraints, such as memory, power, or complexity constraints.

Based on time period T, the audio transmitter 200 may obtain the portion of audio data 210 that is to be processed together. For example, audio data 214 may be the portion of audio data received during time period 212, wherein time period 212 is set to a time period T. Audio data 214 may be a subset of audio data 210 that is received during time period 212, where time period 212 may be set to the predefined and/or adjustable time period T. Audio data 214 may undergo the subsequent frequency injection processing by audio transmitter 200.

In some embodiments, in order to perform the frequency processing of the audio data 214 for frequency injection, the audio data 214 may be transformed from time-domain data to frequency-domain data. For example, in some embodiments a fast Fourier transform (FFT) may be used to transform time-domain data to frequency-domain data. A FFT may be used to transform the time-domain audio data 214 to the frequency-domain audio data 224. Audio data 224 is illustrated in FIG. 2 as including data at frequencies of 100, 125, 150, 175, and 200 Hz corresponding to frequency tones 220*a-e*. Audio data 224 is illustrated in FIG. 2 as including frequency tones 220*a-e* for illustrative purposes only as one of skill in the art would readily recognize that audio data 224 may include more frequency data at frequencies other than 100, 125, 150, 175, and 200 Hz. For example, in another embodiment, audio data 224 may be represented by line 225.

According to some embodiments, the audio processor 200 may analyze the frequency-domain audio data 224 to identify one or more frequencies in the audio data that have a magnitude greater than or equal to a magnitude threshold. In the embodiment illustrated in FIG. 2, the audio processor 200 may identify frequencies 220*b*, 220*d*, and 220*e* as frequencies that are greater than or equal to magnitude threshold 228. In some embodiments, the magnitude threshold 228 may be a predefined and/or adjustable threshold. For example, magnitude threshold 228 may be a dynamic threshold that is adjusted to meet various constraints, such as signal strength and/or SNR.

Upon identifying frequencies 220*b*, 220*d*, and 220*e* as the frequencies that are greater than or equal to magnitude threshold 228, the audio processor 200 may add a frequency tone having a first frequency to each of the identified one or more frequencies 220*b*, 220*d*, and 220*e* to obtain identification data, which may be copied elsewhere in the signal spectrum such that the identification data is inaudible to a listener. For example, low amplitude signals at amplitudes of 15-20 kHz may be used for the identification data. In some embodiments, the first frequency may be a frequency that results in the high frequency data being located approximately above a human-audible frequency and thus inaudible to a listener. For example, the first frequency may be a frequency greater than or equal to 20 kHz or greater than or equal to a maximum human-audible frequency. The resulting high frequency data 234 may be obtained by setting the injected first frequency to 50 kHz. The resulting high frequency data 234 includes data at frequencies of 50.125, 50.175, and 50.2 kHz corresponding to frequency tones 230*b*, 230*d*, and 230*e*.

High frequency data 234 may include frequency tones 230*b*, 230*d*, and 230*e* for illustrative purposes only as one of skill in the art would readily recognize that high frequency data 234 may include more frequency data at frequencies other than 50.125, 50.175, and 50.2 kHz. For example, in another embodiment, high frequency data 234 may include a range of frequencies. High frequency data 234 added to the audio data 224 may include a range of higher frequencies to include information to be transmitted with the audio data 224. As an example, the added high frequency data 234 may include information that characterizes audio data 224, that identifies the peak frequencies of the audio data 224, that identifies the amplitudes of the data in audio data 224, or other information associated with the audio data 224.

After obtaining the high frequency data 234, the audio processor 200 may add the audio data 224 and the high frequency data 234 together and output the combined audio data 224 and the high frequency data 234 to a receiving device. For example, audio data processing component 240 may convert the combined audio data 224 and high frequency data 234 into data which can be processed and output by the transducer 250. Although transducer 250 is illustrated as being located within audio transmitter 200 in FIG. 2, in other embodiments, transducer 250 may not be located within audio transmitter 200. For example, one or more aspects of audio transmitter 200, except for aspects associated with the transducer, may be performed by an information handling system located where the audio data is generated. As an example, a provider of media content may include an information handling system that includes one or more aspects of the audio transmitter 200, such as all aspects of audio transmitter 200 except that of transducer 250. In such an embodiment, the output of audio data processing block 240 may be output to another device that includes transducer 250 for subsequent output by the transducer 250 of the another device.

Figure 3:
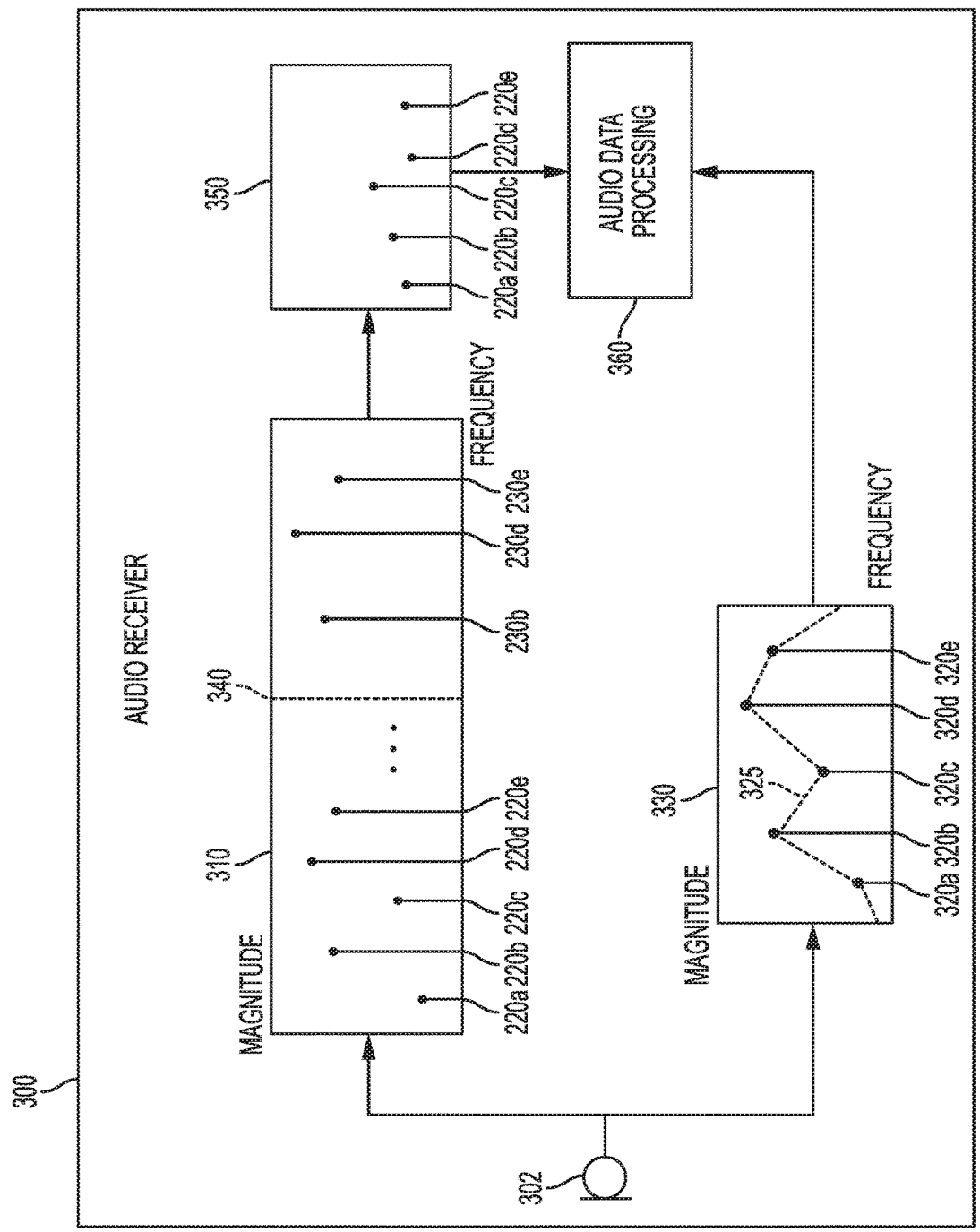
FIG. 3 is a block diagram of an audio receiver illustrating the detection of a frequency signal injected into an audio signal according to some embodiments of the disclosure.

FIG. 3 is a block diagram of an audio receiver of an information handling system and illustrates the detection of a frequency signal injected into an audio signal according to some embodiments of the disclosure. An audio receiver 300 may receive data that includes audio data and high frequency data that is associated with one or more frequencies in the audio data. For example, the audio receiver 300 may receive from microphone 302 data 310 that includes audio data at frequencies 220*a*-220*e* and high frequency data at frequencies 230*b*, 230*d*, and 230*e*. High frequency data at frequencies 230*b*, 230*d*, and 230*e* may be associated with audio data at frequencies 220*b*, 220*d*, and 220*e* because, as explained in the discussion of FIG. 2, high frequency data at frequencies 230*b*, 230*d*, and 230*e* includes data that is a copy of audio data describing peak frequencies 220*b*, 220*d*, and 220*e* that has been shifted up 50 kHz. In some embodiments, a FFT may be used to transform the time-domain data received by microphone 302 to the frequency-domain data illustrated in FIG. 3.

The audio receiver 300 may identify the one or more frequencies 220*b*, 220*d*, and 220*e* in the audio data 310 that are associated with the high frequency data at frequencies 230*b*, 230*d*, and 230*e*. The high frequency data may be identified by first comparing the received combined audio data at frequencies 220*a-e* and high frequency data at frequencies 230*b*, 230*d*, and 230*e* to a frequency threshold 340 and identifying the high frequency data at frequencies 230*b*, 230*d*, and 230*e* of received audio data 310 as the data having frequencies greater than or equal to the frequency threshold 340. To then identify the one or more audio data frequencies 220*b*, 220*d*, and 220*e* in the received audio data 310 that are associated with the high frequency data at frequencies 230*b*, 230*d*, and 230*e*, the audio receiver 300 may subtract a first frequency from the identified high frequency data at frequencies 230*b*, 230*d*, and 230*e*. In some embodiments, the first frequency may be the same frequency used to shift up the frequencies that exceeded the magnitude threshold 228 in FIG. 2. Therefore, in one embodiment, the first frequency used to shift down the high frequency data at frequencies 230*b*, 230*d*, and 230*e* to identify the frequencies 220*b*, 220*d*, and 220*e* of the audio data of received data 310 associated with the high frequency data at frequencies 230*b*, 230*d*, and 230*e* may be 50 kHz, the same frequency used to obtain the high frequency data at frequencies 230*b*, 230*d*, and 230*e*. In other embodiments, shifts of the frequency peaks may be different fixed values or may be values that vary, e.g., linearly, or encode the frequencies 220*b*, 220*d*, and 220*e* by other techniques.

Upon identifying the audio data frequencies 220*b*, 220*d*, and 220*e* in the received data 310 that are associated with the high frequency data at frequencies 230*b*, 230*d*, and 230*e*, the audio receiver 300 may attenuate the one or more frequencies 220*b*, 220*d*, and 220*e* in the audio data of received data 310 to obtain modified audio data 350. In some embodiments, one or more band-stop filters may be used to attenuate the one or more frequencies 220*b*, 220*d*, and 220*e* in the audio data of received data 310 to obtain modified audio data 350. The resulting modified audio data 350 may include data at the same frequencies as the original audio data 224, namely at the frequencies 220*a-e*. The difference between the resulting modified audio data 350 that will be further processed by audio receiver 300 and the original audio data 224 processed by audio transmitter 200 is that the magnitudes of data at frequencies 220*b*, 220*d*, and 220*e* of audio data 350 is smaller in comparison to the magnitudes of the data at the same frequencies of original audio data 224. With smaller amplitudes, the overall power of the resulting audio data 350 may be smaller than the power of original audio data 224.

According to some embodiments, by reducing the overall power of the audio data 350 that eventually gets processed by the audio receiver 300, the probability of falsely triggering voice-activated functionality of the information handling system that includes audio receiver 300 may be reduced. For example, audio data 350, in which the data at frequencies 220*b*, 220*d*, and 220*e* has been reduced, may be output for further audio processing by audio receiver 300, such as at audio data processing block 360. In some embodiments, audio data processing block 360 may process audio data and trigger voice-activated functionality of the information handling system that includes audio receiver 300 when the processed audio data matches the triggering audio data associated with the voice-activated functionality.

As noted previously, the profile of audio data 224 may match the profile of audio data that triggers voice-activated functionality in the information handling system that includes audio receiver 300. Therefore, if audio data processing block 360 were to process audio data 224 unmodified, the associated voice-activated functionality may be falsely triggered even though the user of the information handling system did not intend for the voice-activated functionality to be activated. However, when the audio data processing block 360 processes audio data 350, in which the data at frequencies 220*b*, 220*d*, and 220*e* has been reduced, the audio data processing block 360 may detect that the profile of audio data 350 may not match the profile of audio data that triggers voice-activated functionality in the information handling system that includes audio receiver 300, for example because the overall power and/or the power at certain frequencies does not match the triggering audio data profile. As a result, the audio data processing block 360 may forego falsely triggering voice-activated functionality based on audio data 350. Accordingly, the combined audio data at frequencies 220*a-e*, and the high frequency data at frequencies 230*b*, 230*d*, and 230*e* may indicate to the audio receiver 300 the frequencies 220*b*, 220*d*, and 220*e* that should be reduced in magnitude to reduce the probability of falsely triggering voice-activated functionality of the information handling system that includes audio receiver 300. In some embodiments, the frequencies that should be reduced in magnitude include at least some of the identified one or more frequencies 220*b*, 220*d*, and 220*e*.

In some embodiments, when the audio receiver 300 receives audio data that should trigger voice-activated functionality, the audio receiver may properly trigger the voice-activated functionality. For example, the audio receiver 300 may also receive additional audio data 330. Audio data 330 includes data at frequencies of 100, 125, 150, 175, and 200 Hz corresponding to frequency tones 320*a-e*, which may also correspond to frequency tones 220*a-e*. Audio data 330 includes frequency tones 320*a-e* for illustrative purposes only as one of skill in the art would readily recognize that audio data 330 may include more frequency data at frequencies other than 100, 125, 150, 175, and 200 Hz. For example, in another embodiment, audio data 330 may be represented by line 325.

Audio data 330 may have the same data profile as audio data 224, therefore audio data 330 and audio data 224 may be capable of triggering the same voice-activated functionality. Audio receiver 300 should not trigger the voice-activated functionality based on reception of audio data 310 corresponding to audio data 224 because audio data 224 was generated by an electronic device. Audio receiver 300 should trigger the voice-activated functionality based on reception of audio data 330 because audio data 330 may correspond to a voice command from a user of the information handling system to trigger the voice-activated functionality. Therefore, audio data processing block 360 may trigger the associated voice-activated functionality upon receiving and processing audio data 330, while not falsely triggering the associated voice-activated functionality upon receiving and processing audio data associated with audio data 224 that was generated by an electronic device. This may operate to increase the SNR of an information handling system that includes voice-activated functionality because the system may process legitimate voice command audio data to trigger associated voice-activate functionality while attenuating similar audio data output by an electronic device to prevent falsely triggering voice-activated functionality.

In some embodiments, rather than attenuating the one or more frequencies 220*b*, 220*d*, and 220*e*, the audio receiver 300 may ignore the audio data of received data 310 at the frequencies 220*b*, 220*d*, and 220*e* to obtain the audio data that gets processed by audio data processing block 360. For example, upon identifying the audio data frequencies 220*b*, 220*d*, and 220*e* in the received data 310 that are associated with the high frequency data at frequencies 230*b*, 230*d*, and 230*e*, the audio receiver 300 may flag the data at the audio data frequencies 220*b*, 220*d*, and 220*e* in the received data 310 that are associated with the high frequency data at frequencies 230*b*, 230*d*, and 230*e* as data that should be ignored by audio data processing block 360. The effect may be approximately the same as when the data at audio data frequencies 220*b*, 220*d*, and 220*e* was attenuated because by ignoring the data at the audio data frequencies 220*b*, 220*d*, and 220*e* in the received data 310 that are associated with the high frequency data at frequencies 230*b*, 230*d*, and 230*e*, the audio data that gets processed, i.e., that is not ignored, by audio data processing block 360 may no longer match the audio data profile that triggers voice-activated functionality. Therefore, as was the case when the data was attenuated as opposed to ignored, ignoring the data at the audio data frequencies 220*b*, 220*d*, and 220*e* in the received data 310 that are associated with the high frequency data at frequencies 230*b*, 230*d*, and 230*e* may reduce the probability of the information handling system that includes the audio receiver 300 falsely triggering the voice-activated functionality. Accordingly, the discussion of the advantages and results of attenuating data, as provided above, may also be applicable when the data is ignored instead of attenuated.

In some embodiments, an information handling system according to this disclosure may also be configured to control the injection, detection, and processing of high frequency signals into audio data. For example, during a first time period an information handling system may turn on the injection functionality so that frequency signals may be injected into audio data in accordance with embodiments of this disclosure, and during a second time period the information handling system may turn off the injection functionality so that frequency signals cannot be injected into audio data even when conditions that would otherwise require injection are satisfied. An information handling system may be configured to process the received audio data before frequency signal injection to determine if there are frequencies in the received audio data that are within the range of frequencies that can be output by a human voice. When an information handling system determines no such signals, the information handling system may forego frequency signal injection, i.e., may not add a higher frequency signal to the received audio data, instead outputting the received audio data without adding a higher frequency signal to the audio data. In another embodiment, an information handling system may be configured to perform the high frequency-signal injection functionality disclosed herein, such as with respect to FIG. 2, only when audio data is associated with certain content, such as advertisement/commercial content, but not when the audio data is associated with other content, such as main programming content.

Similarly, in some embodiments, during a first time period an information handling system may turn on the high-frequency signal detection and/or processing functionality so that frequency signals injected into audio data may be detected and/or processed in accordance with embodiments of this disclosure, and during a second time period the information handling system may turn off the high-frequency signal detection and/or processing functionality so that frequency signals injected into audio data may not be detected and/or processed.

In another embodiment, an information handling system receiving data that includes audio data and high frequency data that is associated with one or more frequencies in the audio data may process the high frequency injection signal data to perform certain functions. For example, upon identifying one or more frequencies in the audio data that are associated with the high frequency data injected in the audio data, an information handling system may initiate functions of the information handling system, such as functions that cause the information handling system to communicate with another electronic device, to turn on a light, to turn on another electronic device, or to operate another electronic device.

Figure 4:
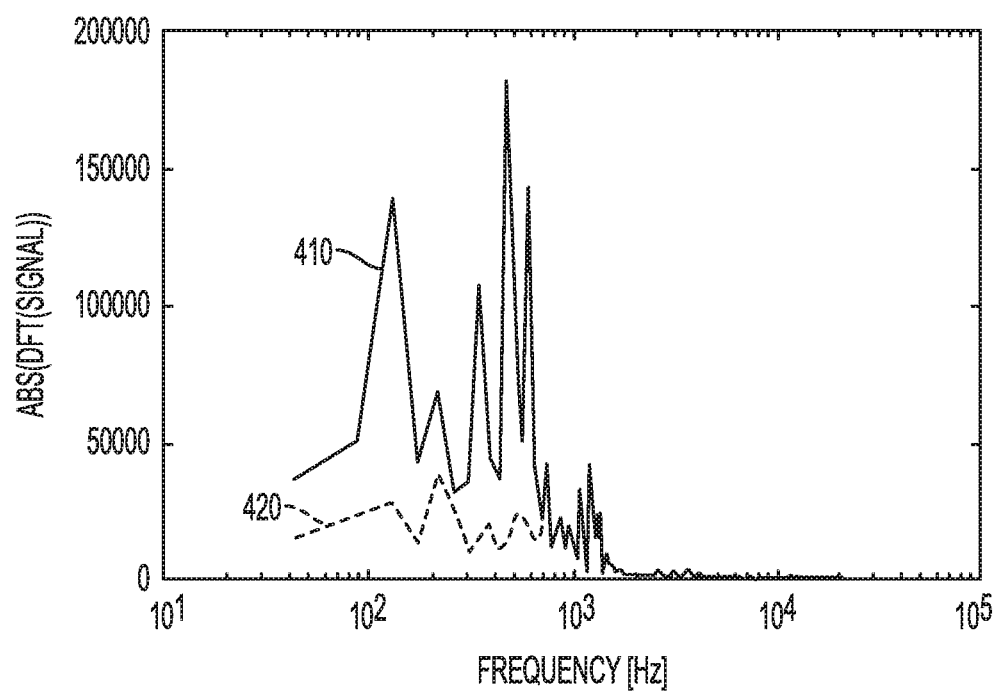
FIG. 4 is a frequency-domain plot illustrating the attenuation of frequencies in an audio signal based on detection of an injected frequency signal according to some embodiments of the disclosure.

FIG. 4 is a frequency-domain plot illustrating the attenuation of frequencies in an audio signal based on detection of an injected frequency signal according to some embodiments of the disclosure. In particular, in FIG. 4, signal 410 may correspond to audio data, output by an electronic device, that may match an audio data profile that triggers voice-activated functionality of an information handling system. Because audio data associated with signal 410 is output by an electronic device as opposed to a user, the audio data associated with signal 410 may be false-triggering audio data because it may trigger voice-activated functionality of an information handling system even though the user of the information handling system did not intend for the voice-activated functionality to be activated, e.g., the user did not issue the voice command to trigger the voice-activated functionality.

Signal 420 may correspond to audio data that gets processed by an audio data processing block of an information handling system after an audio transmitter and an audio receiver process signal 410 in accordance with embodiments of this disclosure. For example, signal 410 may be the frequency representation of original audio data, similar to the frequency representation of original audio data 224 illustrated in FIG. 2. Similarly, signal 420 may be the frequency representation of the final modified audio data processed by an audio data processing block of an audio receiver, similar to the final modified audio data 350 processed by audio data processing block 360 as illustrated in FIG. 3. Accordingly, signal 420 may represent signal 410 after frequency peaks have been attenuated to reduce the probability of falsely triggering voice-activated functionality of the information handling system based on original audio data 410 output by an electronic device. As illustrated in FIG. 4, an audio transmitter and an audio receiver processing signal 410 in accordance with embodiments of this disclosure may result in a final modified signal 420 having certain frequency peaks attenuated compared to the original audio data 410. In some embodiments, because of the attenuation of certain frequency information in signal 420, signal 420 may no longer match an audio data profile that triggers voice-activated functionality of an information handling system, even though signal 410 originally did match an audio data profile that triggers voice-activated functionality of an information handling system. Therefore, FIG. 4 illustrates that when final modified signal 420, resulting from an audio transmitter and an audio receiver processing signal 410 in accordance with embodiments of this disclosure, gets processed by an audio data processing block of an information handling system, the probability of falsely triggering voice-activated functionality may be reduced compared to the probability that voice-activated functionality gets triggered when original signal 410 is processed by an audio data processing block of an information handling system.

Figure 5A:
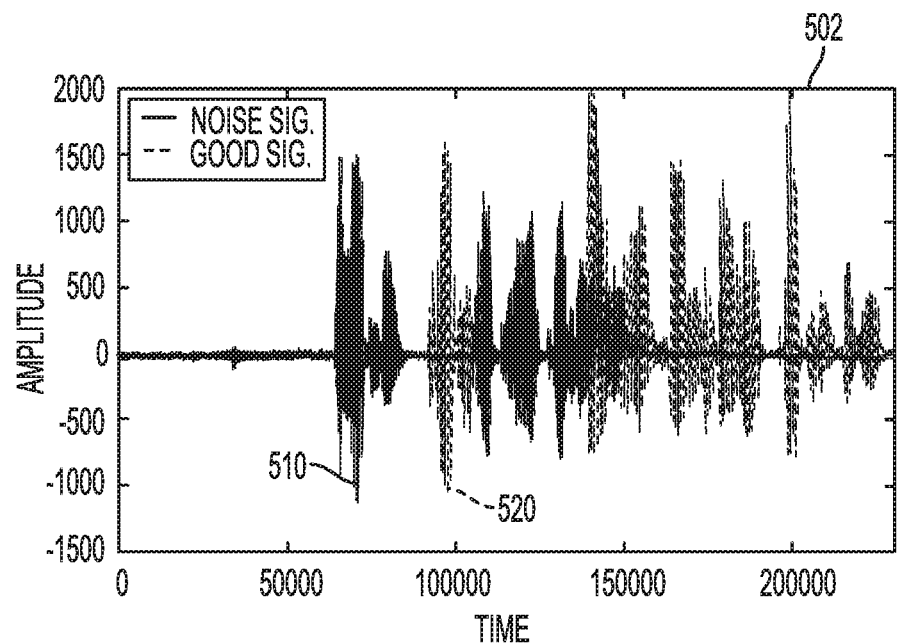
FIGS. 5A-B is a time-domain plot illustrating the attenuation of an audio signal based on detection of an injected frequency signal according to some embodiments of the disclosure.
Figure 5B:
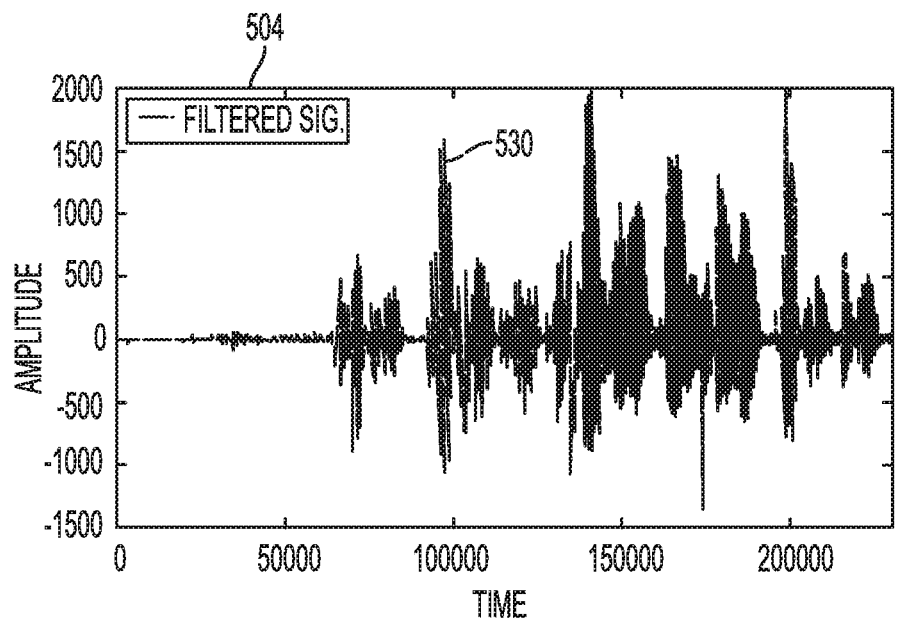

FIGS. 5A-B are time-domain plot illustrating the attenuation of an audio signal based on detection of an injected frequency signal according to some embodiments of the disclosure. In plot 502 of FIG. 5A, signal 510 may correspond to false-triggering audio data, for example audio data output by an electronic device. Signal 520 may correspond to a voice command that is intended to trigger voice-activated functionality of an information handling system. As illustrated in FIG. 5A, the waveforms for signal 510 and 520 are similar. Accordingly, signal 510, if not modified, may trigger voice-activated functionality of an information handling system before the legitimate voice command signal 520 is received.

Plot 504 of FIG. 5B illustrates the result of processing a microphone signal in accordance with embodiments of this disclosure. A microphone may receive the signals 510 and 520 from the noise source and the speaker, respectively. The noise signal 510 embedded in the received audio data may be identified and attenuated as described in embodiments of the invention. Plot 504 shown in FIG. 5B shows processed signal 530, which may be the final modified signal processed by an audio data processing block after signal 510 has been processed in accordance with embodiments of this disclosure. That is, signal 530 may be similar to a time-domain representation of the final modified audio data 350 processed by audio data processing block 360 as illustrated in FIG. 3. As illustrated in plot 504, signal 530 includes data that is attenuated in comparison to the data in original signal 510. For example, the noise at approximately time 70,000 is attenuated. However, signal 520 is generally not attenuated. For example, the good signal at approximately time 100,000 remains in signal 530. Therefore, FIGS. 5A-B illustrates that when final modified signal 530, resulting from an audio transmitter and an audio receiver processing signal 510 in accordance with embodiments of this disclosure, gets processed by an audio data processing block of an information handling system, the probability of falsely triggering voice-activated functionality may be reduced compared to the probability that voice-activated functionality gets triggered when original signal 510 is processed by an audio data processing block of an information handling system. Accordingly, the voice-activated functionality of the information handling system may not get triggered until signal 520 is received, which is the desired result.

Figure 6:
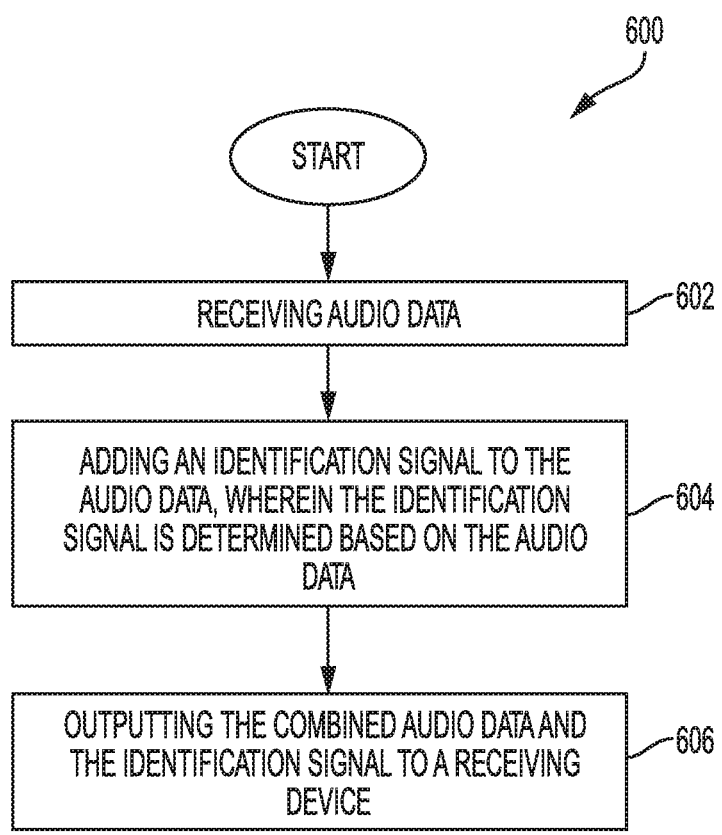
FIG. 6 is a flow chart illustrating a method for injecting a frequency signal into an audio signal to identify the audio signal as a noise signal according to some embodiments of the disclosure.

FIG. 6 is a flow chart illustrating a method for injecting a frequency signal into an audio signal to identify the audio signal as a noise signal according to some embodiments of the disclosure. Method 600 may be implemented with the systems described in this disclosure. Method 600 begins, at block 602, with receiving audio data. At block 604, method 600 includes adding an identification signal to the audio data, wherein the identification signal is determined based on the audio data. Method 600 includes, at block 606, outputting the combined audio data and the identification signal to a receiving device.

Figure 8:
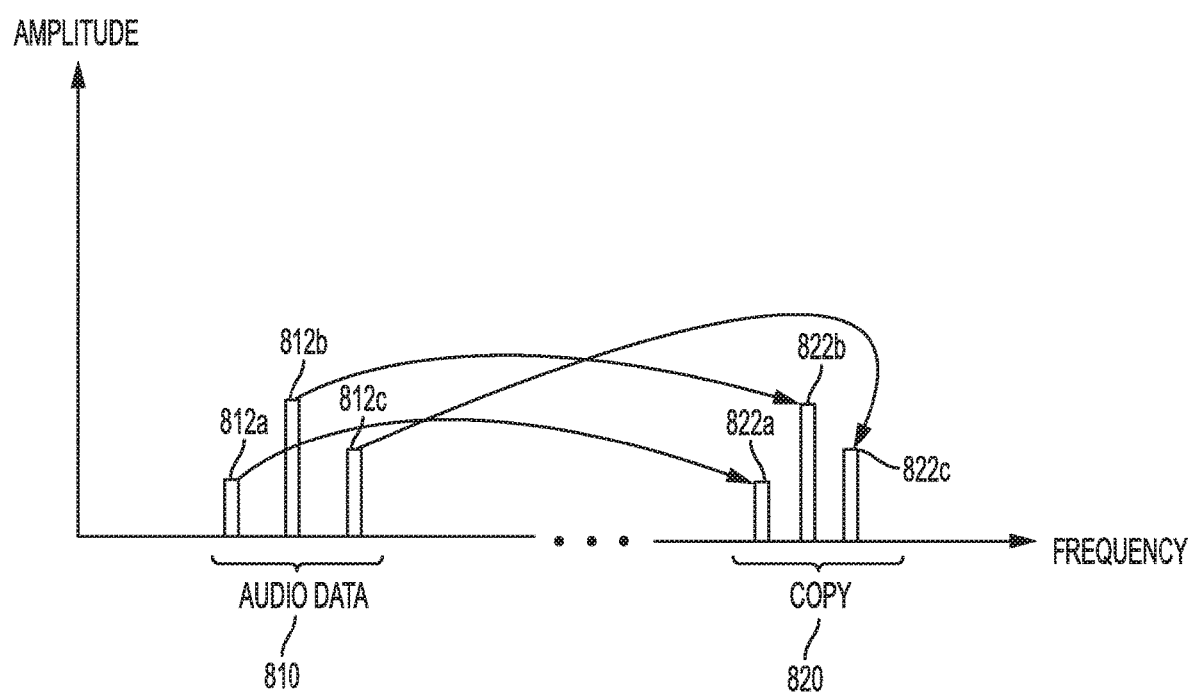
FIG. 8 is a frequency-domain plot illustrating the copying of one or more frequencies of the audio data to frequencies above a human-audible frequency according to some embodiments of the disclosure.

In certain embodiments, the identification signal may be determined based on the audio data in accordance with the disclosure provided above associated with FIG. 2. In another embodiment, the identification signal may be determined based on features of the audio data, such as frequencies associated with the audio data, the length of the audio data, the strength of the audio data signal, the source of the audio data, and the like. For example, in another embodiment, the identification signal added to the audio data by an information handling system may be determined by the information handling system based on frequencies associated with the audio data such that the identification signal includes one or more frequencies of the audio data copied to frequencies above a human-audible frequency. FIG. 8 is a frequency-domain plot illustrating the copying of one or more frequencies of the audio data to frequencies above a human-audible frequency according to some embodiments of the disclosure. In FIG. 8, audio data 810, which includes frequency signals 812a-c, may be copied to higher frequencies such that a copy of audio data 820, which includes frequency signals 822a-c, is located at higher frequencies that are above a human-audible frequency. As illustrated in FIG. 8, the copy of the audio data 820 may include the copy of the frequency signals 822a-c that is a condensed form of frequency signals 812a-c. Accordingly, in FIG. 8, the frequency signals 812a-c may be copied to higher frequencies by applying frequency shifts of different amounts to each of the frequency signals 812a-c. In other embodiments, the frequency signals 812a-c may be copied to higher frequencies by applying frequency shifts of the same amount to each of the frequency signals 812a-c. For example, the identification signal output with the audio data may include at least the high frequency data discussed above with respect to FIG. 2. Accordingly, outputting the combined audio data and the identification signal, such as at block 606, may include outputting the combined audio data and the high frequency data to a receiving device.

Figure 7:
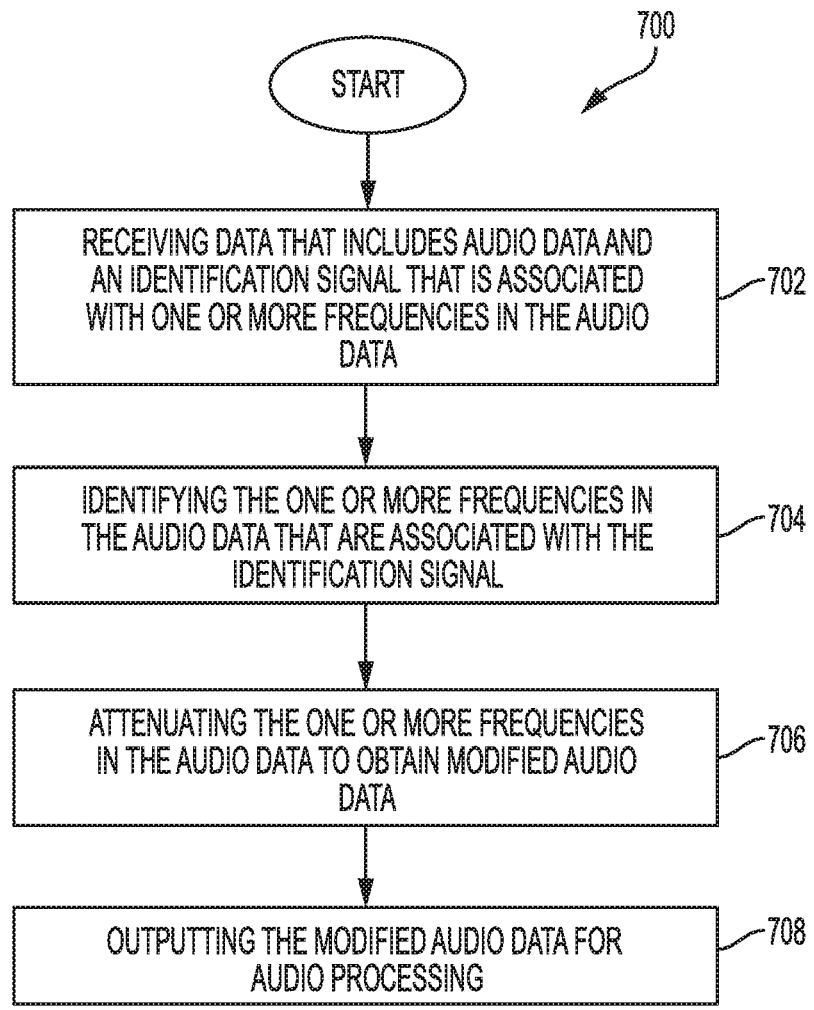
FIG. 7 is a flow chart illustrating a method for detecting and ignoring a noise signal based on an injected frequency signal according to some embodiments of the disclosure.

FIG. 7 is a flow chart illustrating a method for detecting and ignoring a noise signal based on an injected frequency signal according to some embodiments of the disclosure. Method 700 may be implemented with the systems described in this disclosure. Method 700 begins, at block 702, with receiving data that includes audio data and an identification signal that is associated with one or more frequencies in the audio data. In some embodiments, the identification signal may include at least the high frequency data discussed above with respect to FIGS. 2 and 3. At block 704, method 700 includes identifying the one or more frequencies in the audio data that are associated with the identification signal. Method 700 further includes, at block 706, attenuating the one or more frequencies in the audio data to obtain modified audio data. At block 708, method 700 includes outputting the modified audio data for audio processing.

The schematic flow chart diagrams of FIGS. 6-7 are generally set forth as a logical flow chart diagrams. As such, the depicted order and labeled steps are indicative of aspects of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by an information handling system may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although information handling systems are described throughout the detailed description, aspects of the invention may be applied to the design of or implemented on different kinds of information handling system processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), TV, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. An apparatus, comprising:
    a memory; and
    at least one processor coupled to the memory, wherein the at least one processor is configured to:
        receive audio data;
        add an identification signal to the audio data, wherein the identification signal is determined based on the audio data, to produce combined audio data; and
        output the combined audio data to a receiving device, wherein the processor is configured to add the identification signal to the audio signal by copying one or more frequencies of the audio data to one or more higher frequencies above a human-audible frequency, and
        wherein the combined audio data comprises both the one or more frequencies of the audio data and a copy of the one or more frequencies of the audio data at the one or more higher frequencies.

2. The apparatus of claim 1, wherein the at least one processor is further configured to:
    identify one or more frequencies in the audio data that have a magnitude greater than or equal to a magnitude threshold; and
    add a frequency tone having a first frequency to each of the identified one or more frequencies to obtain high frequency data, wherein the identification signal output with the audio data comprises at least the high frequency data.

3. The apparatus of claim 2, wherein the combined audio data indicates to a receiving device frequencies to be reduced in magnitude to reduce the probability of falsely triggering voice-activated functionality of the receiving device, wherein the frequencies to be reduced in magnitude comprise at least some of the identified one or more frequencies.

4. The apparatus of claim 2, wherein the first frequency is a frequency that results in the high frequency data being inaudible.

5. The apparatus of claim 4, wherein the first frequency is a frequency greater than or equal to 20 kilohertz.

6. The apparatus of claim 1, further comprising receiving the audio data during a predefined and adjustable time period.

7. A method, comprising:
    receiving audio data;
    adding an identification signal to the audio data, wherein the identification signal is determined based on the audio data, to produce combined audio; and outputting the combined audio to a receiving device,
wherein adding the identification signal to the audio data comprises copying one or more frequencies of the audio data to one or more higher frequencies above a human-audible frequency, and
wherein the combined audio data includes both the one or more frequencies of the audio data and a copy of the one or more frequencies of the audio data at the one or more higher frequencies.

8. The method of claim 7, further comprising:
identifying one or more frequencies in the audio data that have a magnitude greater than or equal to a magnitude threshold; and
adding a frequency tone having a first frequency to each of the identified one or more frequencies to obtain high frequency data, wherein the identification signal output with the audio data comprises at least the high frequency data.

9. The method of claim 8, wherein the combined audio data indicates to a receiving device frequencies to be reduced in magnitude to reduce the probability of falsely triggering voice-activated functionality of the receiving device, wherein the frequencies to be reduced in magnitude comprise at least some of the identified one or more frequencies.

10. The method of claim 8, wherein the first frequency is a frequency that results in the high frequency data being inaudible.

11. The method of claim 10, wherein the first frequency is a frequency greater than or equal to 20 kilohertz.

12. The method of claim 7, wherein the audio data comprises audio data received during a predefined and adjustable time period.

13. A method, comprising:
receiving data that includes audio data and an identification signal that is associated with one or more frequencies in the audio data, wherein the identification signal comprises one or more frequencies of the audio data copied to one or more higher frequencies above a human-audible frequency;
identifying the one or more frequencies in the audio data that are associated with the identification signal;
attenuating the one or more frequencies in the audio data to obtain modified audio data; and
outputting the modified audio data for audio processing.

14. The method of claim 13, wherein the step of identifying comprises:
identifying high frequency data by comparing the received data that includes audio data and the identification signal to a frequency threshold, wherein high frequency data comprises data having frequencies greater than or equal to the frequency threshold; and
subtracting a first frequency from the identified high frequency data to identify the one or more frequencies in the audio data that are associated with the high frequency data.

15. The method of claim 14, wherein the first frequency is greater than or equal to a maximum human-audible frequency.

16. The method of claim 15, wherein the first frequency is a frequency greater than or equal to 20 kilohertz.

17. The method of claim 13, wherein the step of attenuating reduces the probability of falsely triggering voice-activated functionality.

18. The apparatus of claim 2, wherein the magnitude threshold is a dynamic threshold.

19. The apparatus of claim 1, wherein each of the one or more frequencies of the audio data copied to frequencies above a human-audible frequency is shifted by a different value.

20. The method of claim 7, wherein each of the one or more frequencies of the audio data copied to frequencies above a human-audible frequency is shifted by a different value.

* * * * *